United States Patent
De Domenico et al.

(10) Patent No.: US 9,319,892 B2
(45) Date of Patent: Apr. 19, 2016

(54) DYNAMIC MANAGEMENT OF SMALL CELLS FOR OPTIMIZING THE ENERGY CONSUMPTION OF A NETWORK

(71) Applicant: Commissariat A L'Energie Atomique Et Aux Energies Alternatives, Paris (FR)

(72) Inventors: Antonio De Domenico, Forsinone (IT); Emilio Calvanese Strinati, Grenoble (FR)

(73) Assignee: COMMISSARIAT A L'ENERGIE ATOMIQUE ET AUX ENERGIES ALTERNATIVES (FR)

(*) Notice: Subject to any disclaimer, the term of this patent is extended or adjusted under 35 U.S.C. 154(b) by 0 days.

(21) Appl. No.: 13/762,590

(22) Filed: Feb. 8, 2013

(65) Prior Publication Data
US 2013/0203425 A1  Aug. 8, 2013

(30) Foreign Application Priority Data
Feb. 8, 2012  (FR) ...................................... 12 51163

(51) Int. Cl.
*H04W 40/00* (2009.01)
*H04W 16/32* (2009.01)
*H04W 16/10* (2009.01)
*H04W 84/04* (2009.01)

(52) U.S. Cl.
CPC ............... *H04W 16/32* (2013.01); *H04W 16/10* (2013.01); *H04W 84/045* (2013.01)

(58) Field of Classification Search
CPC ............................. H04W 24/04; H04W 24/00
USPC .......... 455/423, 444, 571, 414.1, 450, 435.1, 455/422.1, 434, 500, 507, 452.1; 370/332, 370/342, 252
See application file for complete search history.

(56) References Cited

U.S. PATENT DOCUMENTS

| | | | |
|---|---|---|---|
| 2010/0169498 A1 | 7/2010 | Palanki et al. | |
| 2010/0261467 A1* | 10/2010 | Chou et al. | 455/422.1 |
| 2011/0065446 A1 | 3/2011 | Mueck et al. | |
| 2011/0317742 A1* | 12/2011 | Kawahatsu et al. | 375/132 |
| 2012/0052793 A1* | 3/2012 | Brisebois et al. | 455/1 |

FOREIGN PATENT DOCUMENTS

| | | |
|---|---|---|
| EP | 2173135 A2 | 4/2010 |
| EP | 2180739 A1 | 4/2010 |
| EP | 2207375 A1 | 7/2010 |

OTHER PUBLICATIONS

British Search Report for Application No. FR1251163 dated Nov. 14, 2012.

(Continued)

*Primary Examiner* — Kiet Doan
(74) *Attorney, Agent, or Firm* — Lerner, David, Littenberg, Krumholz & Mentlik, LLP

(57) ABSTRACT

The invention relates to a method for managing a network of a plurality of base stations of small cells, placed in a region of a macro-cell in which at least one terminal is found, each small cell base station being adapted for covering a small cell, the method being characterized in that a set A of at least one small cell covering said at least one terminal present in the region, is determined, and the smallest subset B of at least one small cell allowing coverage of said at least one terminal is selected from said set A, such that only said at least one small cell of the subset B will have to be active.

19 Claims, 5 Drawing Sheets

(56) References Cited

OTHER PUBLICATIONS

Chen et al: "Characterizing Energy Efficiency and Deployment Efficiency Relations for Green Architecture Design", Communications Workshops (ICC), 2010 IEEE International Conference on, IEEE, Piscataway, NJ, USA, May 23, 2010, pp. 1-5, XP03170448.

3GPP TSG RAN WG4 (Radio) Meeting #51, "Simulation assumptions and parameters for FDD HeNB RF requirements", R4-092042, Alcatel-Lucent, picoChip Designs, Vodafone, San Francisco, CA, May 4-8, 2009.

* cited by examiner

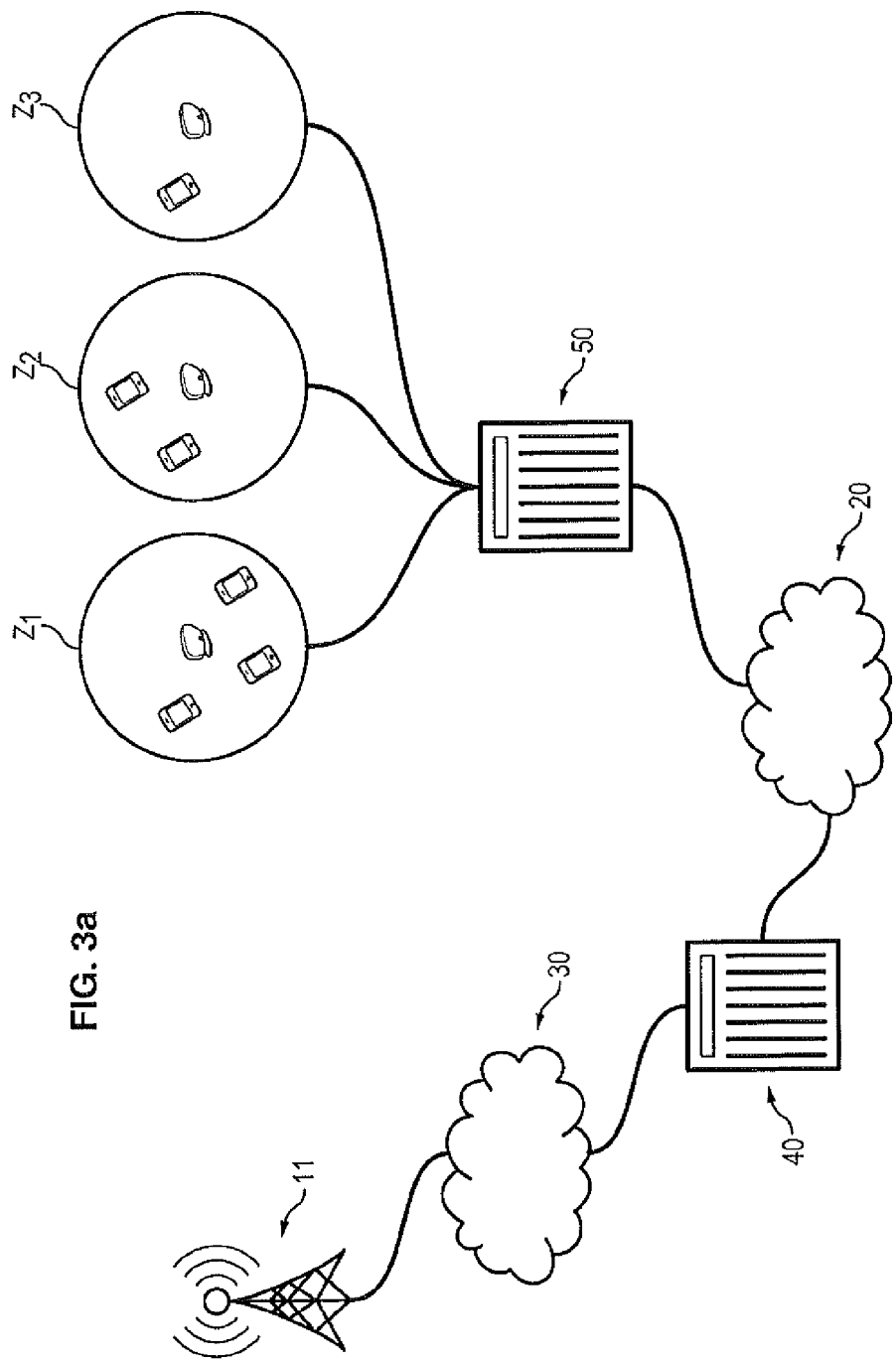

DYNAMIC MANAGEMENT OF SMALL CELLS FOR OPTIMIZING THE ENERGY CONSUMPTION OF A NETWORK

CROSS-REFERENCE TO RELATED APPLICATIONS

The present application claims priority from French Application No. 1251163 filed Feb. 8, 2012, the disclosures of which are hereby incorporated herein by reference.

BACKGROUND OF THE INVENTION

The invention generally relates to the field of cellular communications networks and more particularly to the one applying small cells.

The increasingly common use of terminals connected to a cellular network (for example smartphones, computers, etc.) has caused an increase in traffic so that the cellular networks are increasingly overloaded.

In order to overcome this problem, networks of small cells have been proposed and deployed.

It is specified that the term of small cell designates in the increasing size order: both an attocell, a photocell, a pico-cell or further a micro-cell.

A small cell comprises a small low power base station provided for giving limited radio coverage and dedicated to residential or corporate use. Small cells are often deployed inside buildings and are connected to the network of an operator via a high throughput internet connection and may support a limited number of simultaneous communications (voices or data), typically from two to eight simultaneous communications.

Thus, with small cells it is possible to improve the cell coverage as well as the capacity of the network of an operator in a given area.

A problem is that small cells are often deployed in a chaotic way, without any actual planning so that the level of interferences between neighboring cells increases (a communication in a cell may interfere with a communication in the neighboring cell).

Another problem is that such a deployment reduces the energy efficiency of the network since certain areas may be over equipped with small cells, which causes unnecessary consumption of energy, the small cells may be unnecessarily active.

Reference may be made to the document, Y. Chen, S. Zhang, and S. Xu, "*Characterizing Energy Efficiency and Deployment efficiency Relations for Green Architecture Design*", Proc. IEEE ICC '10, Cape Town, South Africa, May 2010", which has highlighted such problems.

Consequently, there exists a need for smart and dynamic activation of small cells for limiting the energy costs and guaranteeing at the same time a quality of service (QoS) for the users.

BRIEF SUMMARY OF THE INVENTION

The invention meets this need by proposing, according to a first aspect, a method for managing a network of a plurality of small cell base stations, placed in a medium of a macrocell in which at least one terminal is found, each small cell base station being adapted so as to cover a small cell, the method being characterized in that:
a set A of at least one small cell is determined, covering said at least one terminal present in the region;
the smallest subset B of at least one small cell allowing coverage of said at least one terminal, is selected from said set A; only said at least one first cell of the subset B will have to be active.

The invention is advantageously completed by the following features, taken alone or in any of their technical possible combination:
said at least one small cell of said selected subset B is activated;
said at least one small active cell not belonging to said selected subset B is deactivated;
the possible subsets of at least one small cell allowing coverage of all the terminals present in the area are determined exhaustively and in that the smallest small cell subset is selected;
in order to select the subset B, for each terminal present in the region, a membership degree is defined as being the number of small cell(s) covering said terminal, the selection of the smallest subset B being successively carried out for each terminal depending on an increasing membership degree;
the following steps are successively applied for selecting the subset B;
  a) for the terminal having the lowest membership degree, from said at least one small cell of the set A, a small cell is selected, this small cell being an element of the subset B;
  b) for each terminal with an increasing membership degree, greater than the lowest membership degree, the subset B is selected from the subset B obtained for the terminal with a membership degree immediately below by applying the following steps:
    i) it is first checked whether a small cell of the subset B allows coverage of said terminal, and if necessary this small cell is selected;
    ii) if several small cells of the subset B allow coverage of said terminal, a small cell is selected which meets best the selection criterion for said terminal;
    iii) if no small cell of the subset B allows coverage of said terminal, a small cell not belonging to the subset B and which meets best the selection criterion is selected from said set A, this small cell being added to the subset B; said subset B then being used for the terminal with a greater degree;
the selection criterion is a power of the signal received from the first cell by the terminal;
the selection criterion is a distance criterion, the selected first cell being the closest to the relevant terminal.

The invention also proposes a cellular telecommunications network comprising at least one base station, each base station being connected to a plurality of small cells, said network comprising equipment adapted for applying a method according to the invention.

The advantages of the invention are multiple.

With the invention it is possible to adapt the small cell network to the number of terminals present in the region which it covers while limiting interferences between adjacent cells.

With such an adaptation, it is further possible to reduce the energy consumption of the network: only the required small cells are active.

BRIEF DESCRIPTION OF THE DRAWINGS

Other features, objects and advantages of the invention will become apparent from the following description, which is purely an illustration and not a limitation, and which should be read with reference to the appended drawings wherein:

FIGS. 3a and 3b illustrate two embodiments of an architecture of a macrocell according to the invention;

On the whole of the figures, similar elements bear identical numerical references.

DETAILED DESCRIPTION

Figure 1:
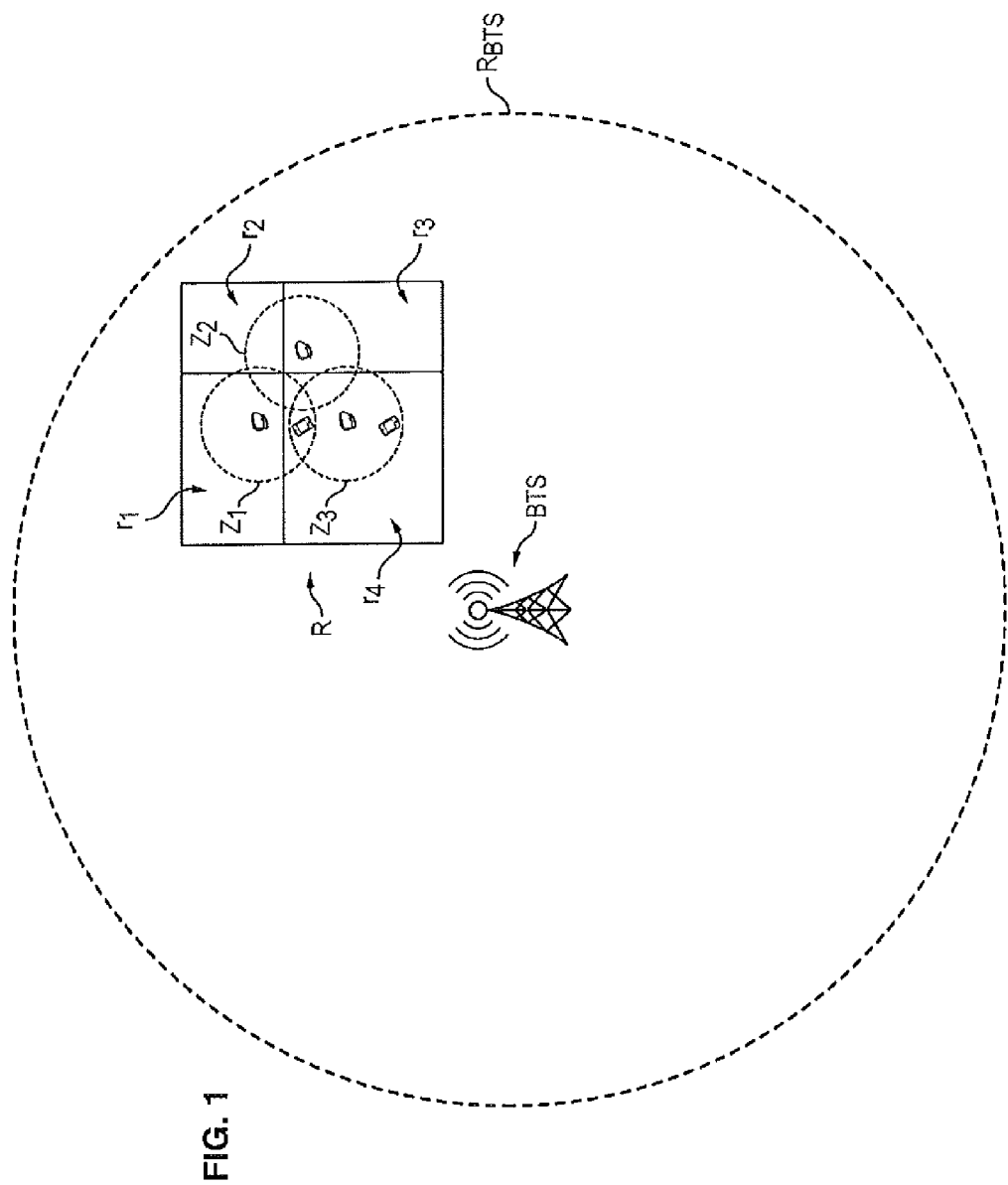
FIG. 1 illustrates a layout between a base station and several small cells.
Figure 2:
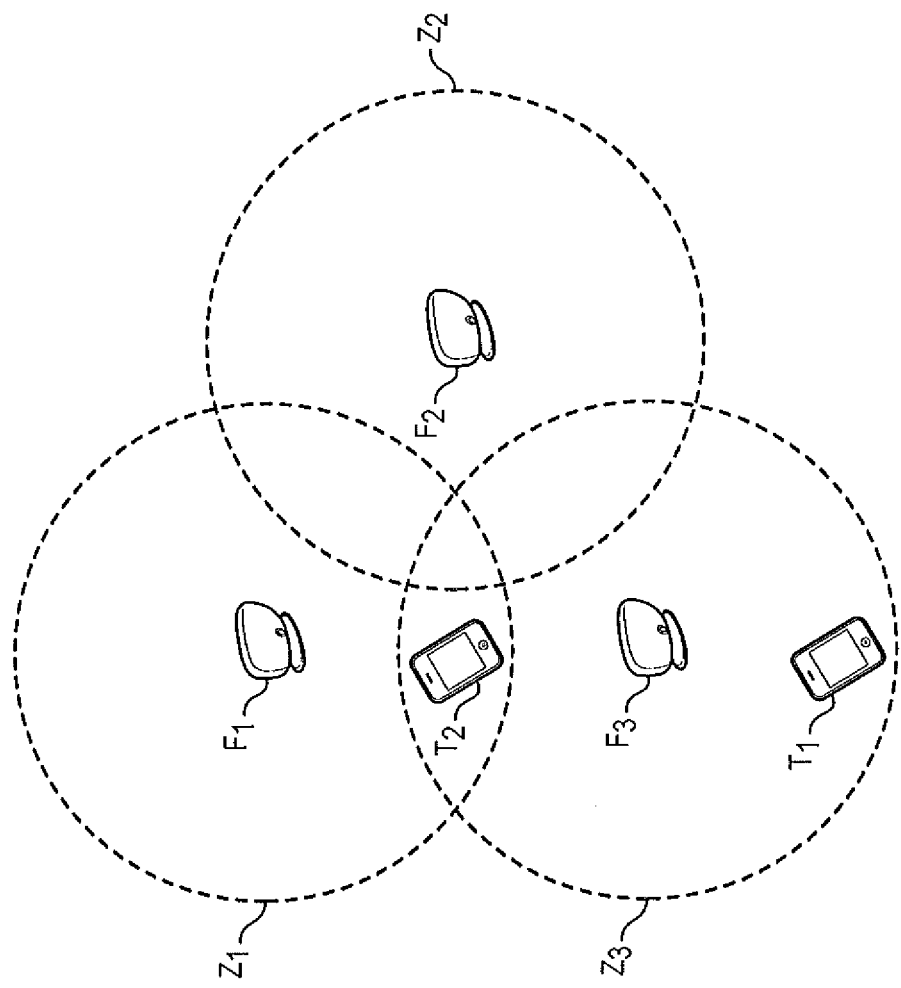
FIG. 2 illustrates a region of FIG. 1 covered by a small cell network.

In connection with FIGS. 1 and 2, a macrocell R-BTS is covered by a base station BTS (Base Transceiver Station).

In the macrocell R-BTS, three small cells Z1, Z2, Z3 are deployed in a region R of the macrocell. Each small cell comprises a base station F1, F2, F3 (see FIG. 2) which controls the communications in the corresponding small cell. A small cell Zi (i=1, 2, 3) is the area covered by the small cell base station Fi.

Each small cell base station is adapted so as to be in a radio link with at least one mobile terminal T1, T2 (such as a smartphone) present in the small cell Zi.

By radio link between a terminal and a small cell base station is meant that the terminal is connected to the small cell base station so that the terminal communicates with this small cell base station.

By « coverage of an area » is further meant the radio area defined by a small cell.

Several deployments of small cells are possible. Document 3GPP TSG-RAN4#51, Alcatel-Lucent, picoChip Designs and Vodafone "*R4-092042, Simulation assumptions and parameters for FDD HENB RF requirements*" May 2009 describes a deployment example according to a grid.

In FIG. 1, three small cells are respectively distributed according to a grid, each box r1, r2, r3 of the grid correspond for example to an apartment or an office of a region R.

Figure 3B:
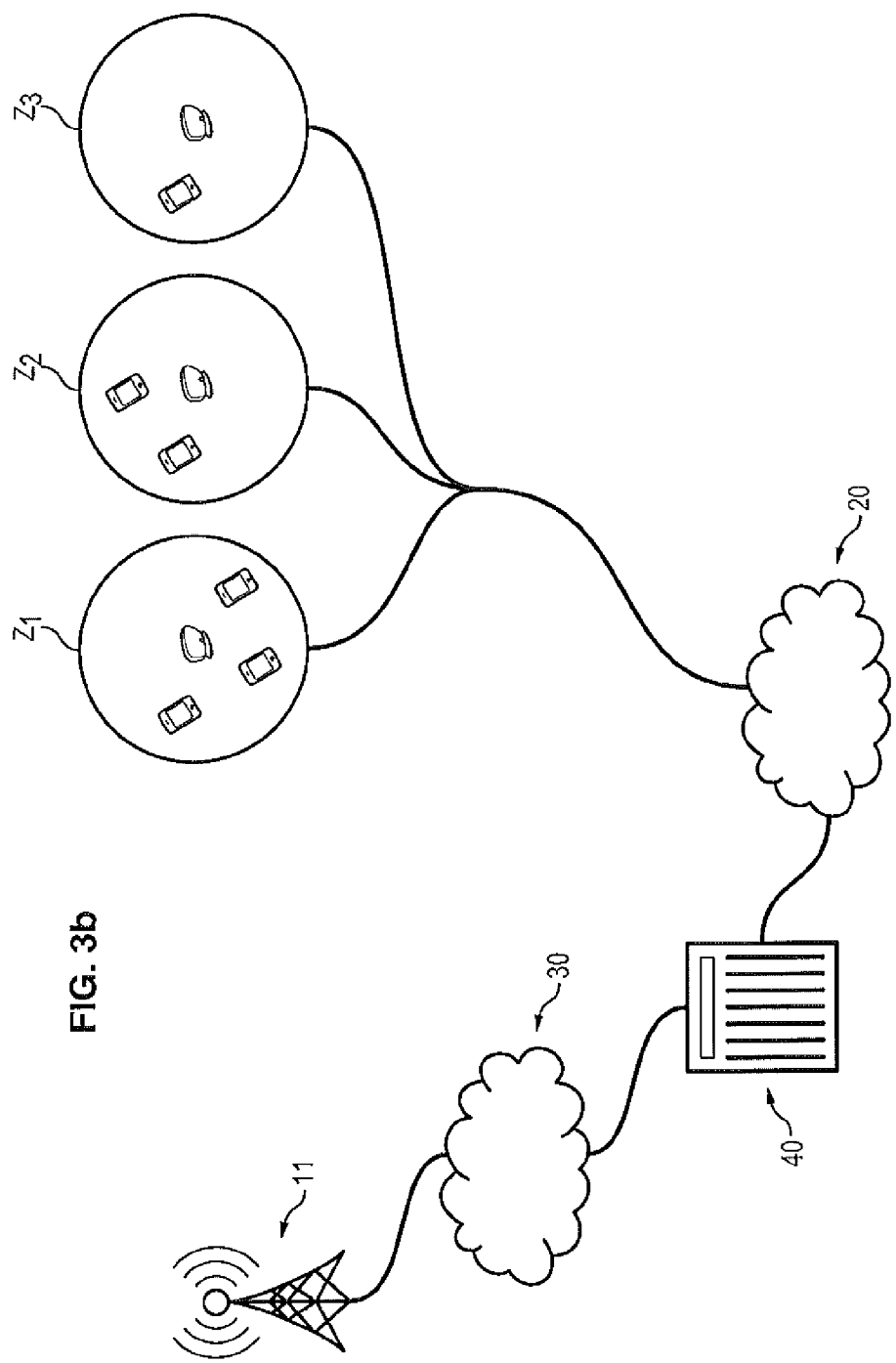

FIGS. 3a and 3b illustrate the architecture of a macrocell R-BTS covered by a base station BTS.

As already mentioned, the small cells Z1, Z2, Z3 are connected to the network of an operator 30 via a high throughput internet network 20.

It is the BTS base station of the macrocell R-BTS which allows the network of the operator to be defined in the latter.

Small cell base stations F1, F2, F3 give the possibility of supporting the traffic intended for or stemming from a mobile telephone Tj present in the region R.

Each small cell base stations may support from two to eight terminals simultaneously and operates in the same band of frequencies as the base station BTS of the macrocell R-BTS.

The interface between the high throughput internet network and the network of the operator is made by means of a gateway 40.

The gateway 40 allows small cell base stations 110 to communicate with the network of the operator 30 transparently without having to introduce modifications to the cellular communications standards.

Further, the gateway 40 avoids that a successive number of terminals are directly connected to the network of the operator 30.

Thus, a terminal which is in a radio link with a small cell communicates with the network of the operator via the latter cell.

The radio link is only possible with an active small cell, i.e. the base station defining the small cell is turned on.

It is specified that if it is considered that the small cell may be active, i.e. that the small cell base station is turned on, or else that the small cell may be inactive i.e. that the small cell base station is turned off.

The handling of the traffic in a macrocell comprising a network of small cell base stations may be applied in different ways.

According to an embodiment, the handling of the traffic towards the small cells is managed in a centralized way. FIG. 3a illustrates such an embodiment. According to this embodiment, the small cell base stations are managed by a management module 50 placed between the internet network 20 and the gateway 40. The management module 50 has the function of managing several small cells (three in FIG. 3a). Thus, the management module 50 is connected to the small cell base stations of the small cell base station network which it has to manage on the one hand and to the Internet network 20 on the other hand. Such a management module 50 allows management of the traffic intended for the small cells, activation/deactivation of the small cells depending on the traffic (see hereafter). Thus, the management module comprises a memory for storing the traffic (i.e. one or several data packets intended for at least one terminal).

According to another embodiment, the management of traffic towards the small cells is managed in a distributed way. FIG. 3b illustrates such an embodiment. According to this embodiment, the small cells themselves may be autonomously activated or deactivated depending on the traffic.

According to this management mode, the set of the data packets which is intended for the terminals which are found in the network of small cells, is directly accessible by the small cell base stations.

There are two possibilities for implementing this management mode:
1) All the small cell base stations receive data packets via the cellular network and they then store these data packets in a memory included in each small cell base station;
2) The data packets intended for the terminals present in the network of small cells are stored in a memory of the gateway; the small cell base stations may then explicitly request from the gateway the sending of the data packets which they have to transmit.

According to another embodiment, the gateway 40 may have the logic function for controlling the small cell network, in this case, the gateway 40 is itself the management module.

Figure 4:
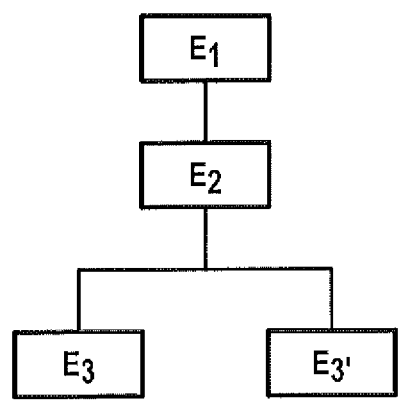
FIG. 4 illustrates steps of a method according to an embodiment of the invention.

Now, a method for managing several small cells is described in connection with FIGS. 2 and 4.

Two terminals T1, T2 are considered in the region R in which three small cells F1, F2, F3 are deployed.

As the goal is that for a given region R, the number of active small cells be a minimum while allowing all the terminals T1, T2 present in the region R to be connected to a small cell, the unnecessary cells are then deactivated.

In one step E1, a set A of at least one small cell allowing coverage of each terminal present in the region R, is determined.

In this step, the question is to determine in which small cell(s), each terminal of the network of small cells is found. In this way, it is possible to determine the possible connections between a terminal and a small cell base station.

Further, each possible connection between a terminal and a small cell base station may be defined by diverse metrics, metrics which may be used during a selection step (see hereafter).

For each terminal, in the area for covering a small cell base station, a metric may be the distance between the terminal and the small cell base station. Another metric may be an evaluation of the radio link (power level of the signal received by the terminal from the small cell base station). These metrics are used subsequently as a selection criterion.

This step E1 is preferably applied periodically in order to manage the possible displacements of the terminals in the network of small cells and may be applied in several ways:

- each small cell base station may be awakened periodically, for a certain period of time, in order to detect the possible presence of a terminal in its coverage area;
- a terminal may remotely activate a small cell by sending a wake-up message to which the small cell base station is sensitive;
- the management module may be aware of the position of the terminals relatively to a small cell base station via localization information which the terminal may transmit to the management module.

As this will have been understood during the step E1 for determining the set A, the small cells are active during the period of time required for localizing at least one terminal in their coverage area.

Of course, once the determination step E1 is finished, the small cells become inactive again.

In the example of FIG. 2, the terminal T1 is found in the area covered by the small cell F3 while the terminal T2 is found in the area covered by the small cell F1 and in the area covered by the small cell F3.

With this determination step E1, it is thereby possible to have among the small cell deployed in the region R, a set A of small cells for covering the region R (of course depending on the terminals present in the region) while ensuring optimum quality of service.

Subsequently to obtaining the set A of small cell(s), the smallest subset B of small cell(s) for ensuring coverage of all the terminals present in the region R is selected (E2) from the set A; only said small cells of the subset B will then have to be active.

In the case of a centralized management, at the end of the selection step E2, the small cell(s) of the subset B are activated (E3). It is the management module which will apply the selection (E2) and then the activation (E3) of the small cell(s) of the subset B.

In the case of distribution management, the small cell(s) not belonging to the subset B are deactivated (E3').

In the example of FIG. 2, only the small cell F3 is therefore, at the end of the method, activated since it covers both the terminal T1 and the terminal T2, the small cells F1 and F2 as for them being inactive.

In this way, the coverage of the region R is optimized in terms of energy consumption while providing the resources required for managing the traffic relative to the terminals present in the region R.

The selection of the subset B may be accomplished exhaustively by testing one by one all the possible subsets.

Alternatively and preferably, the selection of the subset may be accomplished empirically by considering each terminal one by one.

The selection of the smallest subset B of small cells according to an empirical way is detailed below.

In a first substep, a membership degree Dj corresponding to a terminal Tj is defined. This membership degree is the number of possible small cell(s) for a given terminal, i.e. the number of small cells covering a terminal.

In the example of FIG. 2, for the terminal T1, the membership degree D1 is equal to 1 (the terminal T1 is in the area covered by the small cell F3) while for terminal T2, the membership degree D2 is equal to 2 (the terminal T2 is in the area covered by the small cell F1 and in the area covered by the small cell F3).

This membership degree gives the possibility of forming a hierarchy of the selection from the possible small cells.

For the terminal having the lowest membership degree, a small cell capable of covering said terminal which meets best a selection criterion, this small cell being an element of the subset B, is selected from the small cell(s).

Next, for each terminal with increasing membership degree, greater than the lowest membership degree, the subset B is selected from the subset B obtained for the terminal with a membership degree immediately below by applying the following steps:

i) it is first checked whether a small cell of the subset B allows coverage of said terminal, and if necessary this small cell is selected;
ii) if several small cells of the subset B allow coverage of said terminal, a small cell is selected which meets best the selection criterion for said terminal;
iii) if no small cell of the subset B allows coverage of said terminal, a small cell not belonging to the subset B and which meets best the selection criterion, is selected from said set A, this small cell being added to the subset B; said subset B then being used for the terminal with a greater degree.

The selection criterion may be a distance criterion: the closest small cell from among the small cells of the region R is selected.

Alternatively, the selection criterion may be a power level criterion: the small cell providing the strongest power level.

These are the metrics obtained earlier during the determination step E1.

In the example of FIG. 2, terminal T1 is first considered since the membership degree D1 is the lowest.

For this terminal T1, as already mentioned, only the small cell F3 is possible. Therefore, this small cell F3 is selected.

It is noted that in the case when several small cells are possible for the terminal T1, the one is selected which meets best the selection criterion. This may be for example a percentage of the selection criterion.

Next, for the terminal T2, the first cell F3 is tested first since it has been already selected and it is a small cell which may be suitable for terminal T1.

The small cell F3 is therefore selected and the small cell F1 is not selected.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for managing a network of a plurality of base stations of small cells (F1, F2, F3), placed in a region (R) of a macrocell (R-BTS) in which at least one terminal (T1, T2) is found, each small cell base station (F1, F2, F3) being adapted for covering a small cell (Z1, Z2, Z3), the method being characterized in that:

determining a set A of at least one small cell (Z1,Z3) covering said at least one terminal (T1, T2) present in the region (R), the determination of said set A consisting of localizing each small cell and each terminal for obtaining all the possible connections between a terminal and a small cell of the region (R);

selecting the smallest subset B of at least one small cell (Z3) allowing coverage of said at least one terminal (T1, T2) from said set A;

activating said at least one small cell (Z3) of said selected set B.

2. The method according to claim 1, wherein said at least one active small cell (Z1, Z2) not belonging to said selected subset B is deactivated (E3').

3. The management method according to claim 2, wherein the possible subsets of at least one small cell allowing coverage of all the terminals present in the area are determined exhaustively and in that the smallest small cell subset is selected.

4. A cellular telecommunications network comprising at least one base station, each base station being connected to a plurality of small cells, said network comprising equipment suitable for applying a method according claim 3.

5. The management method according to claim 2, wherein in order to select the subset B, for each terminal present in the region R, a membership degree is defined as being the number of small cell(s) covering said terminal, the selection of the smallest subset B being successively carried out for each terminal depending on an increasing membership degree.

6. A cellular telecommunications network comprising at least one base station, each base station being connected to a plurality of small cells, said network comprising equipment suitable for applying a method according claim 5.

7. A cellular telecommunications network comprising at least one base station, each base station being connected to a plurality of small cells, said network comprising equipment suitable for applying a method according claim 2.

8. The management method according to claim 1, wherein the possible subsets of at least one small cell allowing coverage of all the terminals present in the area are determined exhaustively and in that the smallest small cell subset is selected.

9. A cellular telecommunications network comprising at least one base station, each base station being connected to a plurality of small cells, said network comprising equipment suitable for applying a method according claim 8.

10. The management method according to claim 1, wherein in order to select the subset B, for each terminal present in the region R, a membership degree is defined as being the number of small cell(s) covering said terminal, the selection of the smallest subset B being successively carried out for each terminal depending on an increasing membership degree.

11. A method for managing a network of a plurality of base stations of small cells (F1, F2, F3), placed in a region (R) of a macrocell (R-BTS) in which at least one terminal (T1, T2, T3) is found, each small cell base station (F1, F2, F3) being adapted for covering a small cell (Z1, Z2, Z3), the method being characterized in that:

a set A of at least one small cell (Z1,Z3) covering said at least one terminal (T1, T2) present in the region (R) is determined (E1), the determination of said set A consisting of localizing each small cell and each terminal for obtaining all the possible connections between a terminal and a small cell of the region (R);

the smallest subset B of at least one small cell (Z3) allowing coverage of said at least one terminal (T1, T2) is selected (E2) from said set A;

said at least one small cell (Z3) of said selected set B is activated (E3), wherein in order to select the subset B, for each terminal present in the region R, a membership degree is defined as being the number of small cell(s) covering said terminal, the selection of the smallest subset B being successively carried out for each terminal depending on an increasing membership degree, and The management method according to claim 10, wherein the following steps are successively applied for selecting the subset B:

a) for the terminal having the lowest membership degree, from said at least one small cell of set A, a small cell is selected, this small cell forming an element of the subset B;

b) for each terminal with increasing membership degree, greater than the lowest membership degree, the subset B is selected from the subset B obtained for the terminal with a membership degree immediately below by applying the following steps:

i) it is first checked whether a small cell of the subset B allows coverage of said terminal, and if necessary, this small cell is selected;

ii) if several small cells of the subset B allow coverage of said terminals, a small cell is selected which meets best a selection criterion for said terminal;

iii) if no small cell of the subset B allows coverage of said terminal, from said set A, a small cell is selected, not belonging to the subset B and which meets best the selection criterion, this small cell being added to the subset B; said subset B then being used for the terminal with a greater degree.

12. The management method according to claim 11, wherein the selection criterion is a power of the signal received from the small cell by the terminal.

13. A cellular telecommunications network comprising at least one base station, each base station being connected to a plurality of small cells, said network comprising equipment suitable for applying a method according claim 12.

14. The management method according to claim 11, wherein the selection criterion is a distance criterion, the selected small cell being the closest to the relevant terminal.

15. A cellular telecommunications network comprising at least one base station, each base station being connected to a plurality of small cells, said network comprising equipment suitable for applying a method according claim 14.

16. A cellular telecommunications network comprising at least one base station, each base station being connected to a plurality of small cells, said network comprising equipment suitable for applying a method according claim 11.

17. A cellular telecommunications network comprising at least one base station, each base station being connected to a plurality of small cells, said network comprising equipment suitable for applying a method according claim 10.

18. A cellular telecommunications network comprising at least one base station, each base station being connected to a plurality of small cells, said network comprising equipment suitable for applying a method according claim 1.

19. A cellular telecommunications network comprising at least one base station, each base station being connected to a plurality of small cells, said network comprising equipment suitable for applying a method according claim 18.

* * * * *